United States Patent
Dukat et al.

(10) Patent No.: US 6,386,625 B1
(45) Date of Patent: May 14, 2002

(54) VEHICLE CONSTRUCTION AND METHOD OF MAKING SAME

(75) Inventors: Michael Dukat, Eisingen; Siegfried Walter; Ruediger Jahn, both of Leonberg, all of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/709,346

(22) Filed: Nov. 13, 2000

(30) Foreign Application Priority Data

Nov. 11, 1999 (DE) .......................... 199 54 292

(51) Int. Cl.$^7$ .............................. B60N 3/00; B60R 27/00
(52) U.S. Cl. .................. 296/209; 296/203.03; 296/188; 296/205
(58) Field of Search ........................... 296/209, 203.03, 296/188, 205

(56) References Cited

U.S. PATENT DOCUMENTS

| | | | |
|---|---|---|---|
| 3,292,969 A | * 12/1966 | Eggert, Jr. | 296/205 |
| 5,352,011 A | * 10/1994 | Kihara et al. | 296/203.03 |
| 5,354,115 A | * 10/1994 | Esaki | 296/203.03 |
| 5,370,438 A | * 12/1994 | Mori et al. | 296/209 |
| 5,388,885 A | * 2/1995 | Warren | 296/209 |
| 5,680,886 A | * 10/1997 | Ohsuka | 296/187 |
| 5,700,049 A | * 12/1997 | Shibata | 296/188 |
| 5,785,378 A | * 7/1998 | Seefried et al. | 296/203.03 |
| 5,921,618 A | * 7/1999 | Mori et al. | 296/188 |
| 5,954,390 A | * 9/1999 | Kleinhoffer et al. | 296/205 |
| 6,039,387 A | * 3/2000 | Choi | 296/188 |
| 6,073,992 A | * 6/2000 | Yamauchi et al. | 296/188 |
| 6,135,542 A | * 10/2000 | Emmelmann et al. | 296/205 |
| 6,188,228 B1 | * 1/2001 | Heinz et al. | 296/203.03 |
| 6,193,306 B1 | * 2/2001 | Lee | 296/209 |
| 6,199,940 B1 | * 3/2001 | Hopton et al. | 296/203.01 |

FOREIGN PATENT DOCUMENTS

| | | | | |
|---|---|---|---|---|
| DE | 3011345 | | * 10/1981 | 296/205 |
| DE | 004016730 A | | * 11/1991 | 296/205 |
| DE | 196 03 098 | | 7/1997 | |
| JP | 0039375 | | * 2/1987 | 296/209 |
| JP | 0038084 | | * 2/1988 | 296/209 |
| JP | 0018784 | | * 1/1989 | 296/209 |
| JP | 0109177 | | * 5/1991 | 296/188 |
| JP | 406064561 A | | * 3/1994 | 296/203.03 |
| JP | 406099851 A | | * 4/1994 | 296/203.03 |
| JP | 406166384 A | | * 6/1994 | 296/203.03 |

* cited by examiner

Primary Examiner—Joseph D. Pape
Assistant Examiner—Hilary Gutman
(74) Attorney, Agent, or Firm—Crowell & Moring LLP

(57) ABSTRACT

In a vehicle, a supporting member running lengthwise is located in the area of the lengthwise sill which is fastened to the pillars A, B, and C and which can support itself on an internal supporting block in the event of a side collision.

14 Claims, 6 Drawing Sheets

VEHICLE CONSTRUCTION AND METHOD OF MAKING SAME

BACKGROUND AND SUMMARY OF THE INVENTION

This application claims the priority of 199 54 292.9, filed in Germany, Nov. 11, 1999, the disclosure of which is expressly incorporated by reference herein.

The invention relates to a vehicle with a lateral reinforcement located in the vicinity of the lengthwise sill area of the vehicle body.

A passenger compartment for an automobile with a reinforcing tube integrated into a B-pillar is known from German Patent Document DE 196 03 098 A1, with the reinforcing tube extending in the transverse direction of the vehicle and having a projection of limited length in the lengthwise sill.

A goal of the invention is to provide a vehicle with a reinforcement located in the lengthwise sill area of the vehicle body which is made stable in the event of a lateral impact.

This goal is achieved according to the invention by providing a vehicle with a lateral reinforcement located in an area of a lengthwise supporting member of the vehicle body, wherein the reinforcement includes a supporting member extending lengthwise and partially free which extends over an area between wheel boxes of the vehicle and is fastened by holding elements to body pillars of a lateral inside wall of the vehicle, and wherein between a reinforcing inner part and the lower ends of the body pillars of the side inside wall, a supporting block is located opposite the supporting member.

Additional advantageous features are described below.

Principal advantages achieved with the invention consist in the fact that by a lengthwise lateral reinforcement, as for example a supporting member in the form of a tube in the lengthwise sill on each side of a vehicle body is located, a largely secure vehicle passenger compartment is guaranteed especially in a lateral impact.

This is accomplished by the supporting member extending in the lengthwise sill over approximately the entire length between the wheel boxes of the vehicle and being fastenable by holding elements to the body pillars of an internal side part of the vehicle and one supporting block is located between each inner part of the sill and the lower ends of the body pillars of the lateral inner wall, which is located exactly opposite the supporting members in a horizontal plane. The supporting member is preferably located in the remaining sill space between the outer part of the sill and the lateral inside wall.

In one embodiment of the invention the supporting part of each side of the vehicle is located in an indentation in the body pillars of the inner lateral wall and held by the holding elements. In particular, the supporting members can consist of a tubular part and can be partially wrapped to the body pillars by loop holders.

If no tubular element is used, a full material body made of lightweight metal, steel, or plastic is possible with the supporting member consisting of a round tubular body or a polygonal tubular body that can consist of metal foam for example.

The supporting block is provided so that in the event of a lateral impact the supporting element is prevented from immediately penetrating the interior part of the support. The supporting block can have an open or closed profile and can have a concavely outwardly rounded depression corresponding to the indentation, provided at a distance from the rounded indentation. At the same time, the supporting block can serve to absorb energy as well.

To avoid areas resting against one another, the supporting member is located at a distance from the indentation in the lateral inner wall and the supporting block is at a distance from the back of the indentation.

To achieve additional transverse reinforcement of the vehicle body on the supporting members running lengthwise, a seat cross member of the platform is located so that the middle B-pillar is connected with it and at the same time the supporting member is located opposite this transverse support of the seat. As a result, a stiffening of the body structure is created and the force is transmitted to the opposite body side and the transverse stiffness of the vehicle body to lateral impact is increased.

Other objects, advantages and novel features of the present invention will become apparent from the following detailed description of the invention when considered in conjunction with the accompanying drawings.

DETAILED DESCRIPTION OF THE DRAWINGS

Figure 1:
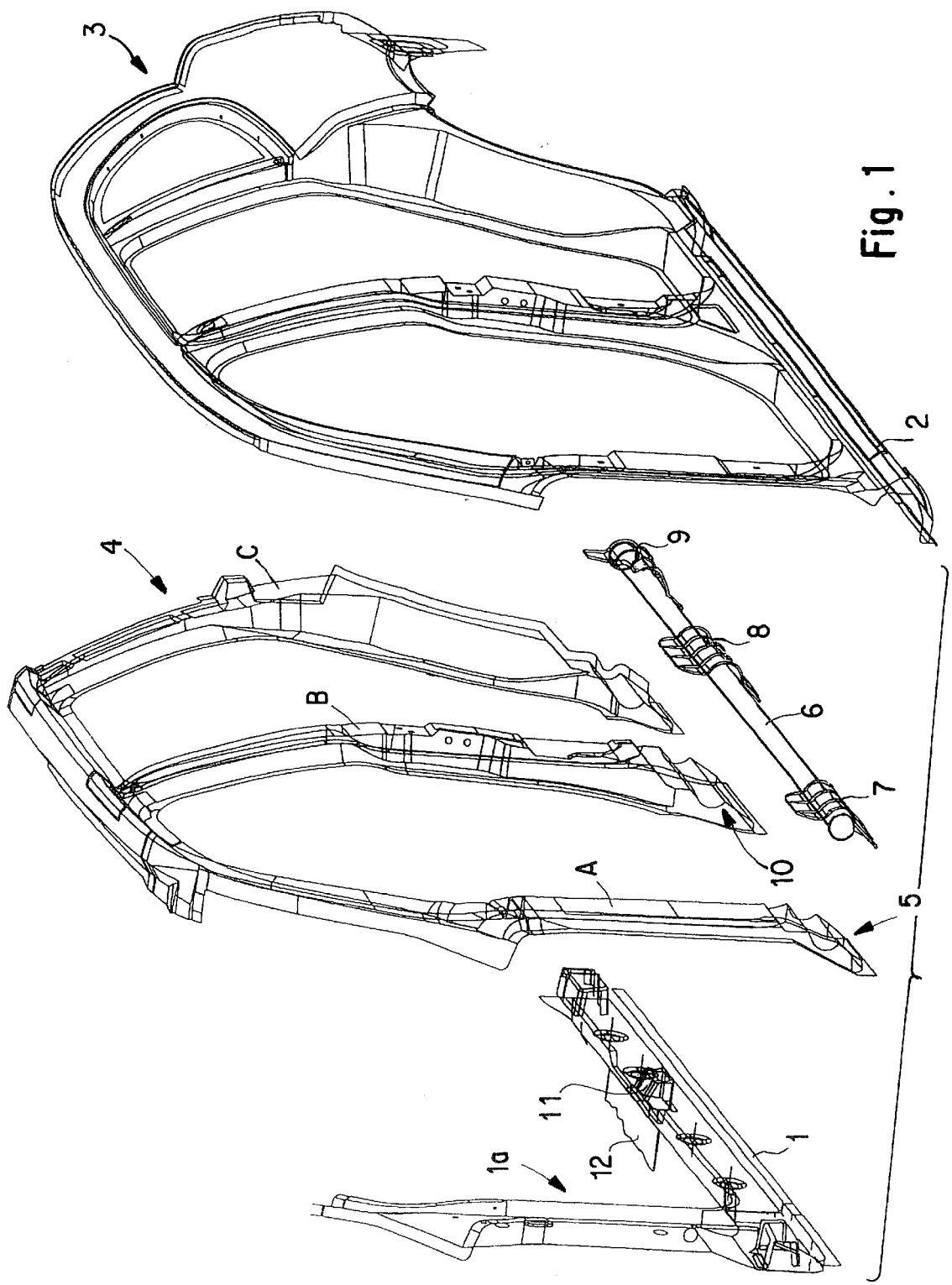
FIG. 1 is an exploded view of a side wall assembly with a supporting member, side internal and side external wall parts, and reinforcing inner part of the vehicle body of a motor vehicle, constructed according to a preferred embodiment of the invention.

As shown in greater detail in FIG. 1, in the vehicle body, between an inner reinforcing part 1 with a body structure 1a and a reinforcing outer part 2 of a side outer wall 3, a side inner wall 4 is provided which has a supporting member 6 running lengthwise in the area of support 5. This supporting member 6 is connected with the lower ends of columns A, B, and C of side inner wall 4 by holding elements 7, 8, and 9.

Supporting member 6 consists of at least one tube fastened in an indentation 10 of pillars A, B, and C by holding elements 7, 8, and 9. These consist of so-called clamps which fit around the tube and are connected with the column ends.

Supporting member 6 can have any cross section as for example a circular cross section, an oval cross section, or a polygonal cross section. It can also consist of a double tube or of a tube with at least one internal lengthwise rib.

On the inner reinforcing part 1 of a support supporting blocks 11 are located opposite the supporting member 6 and which abut the supporting member 6 in the event of a lateral impact. In the resting state, these supporting blocks 11 are located a distance from indentation 10 of columns A, B, and C. Supporting member 6 is also spaced accordingly by holding elements 7, 8, and 9 in the indentations 10.

Figure 6:
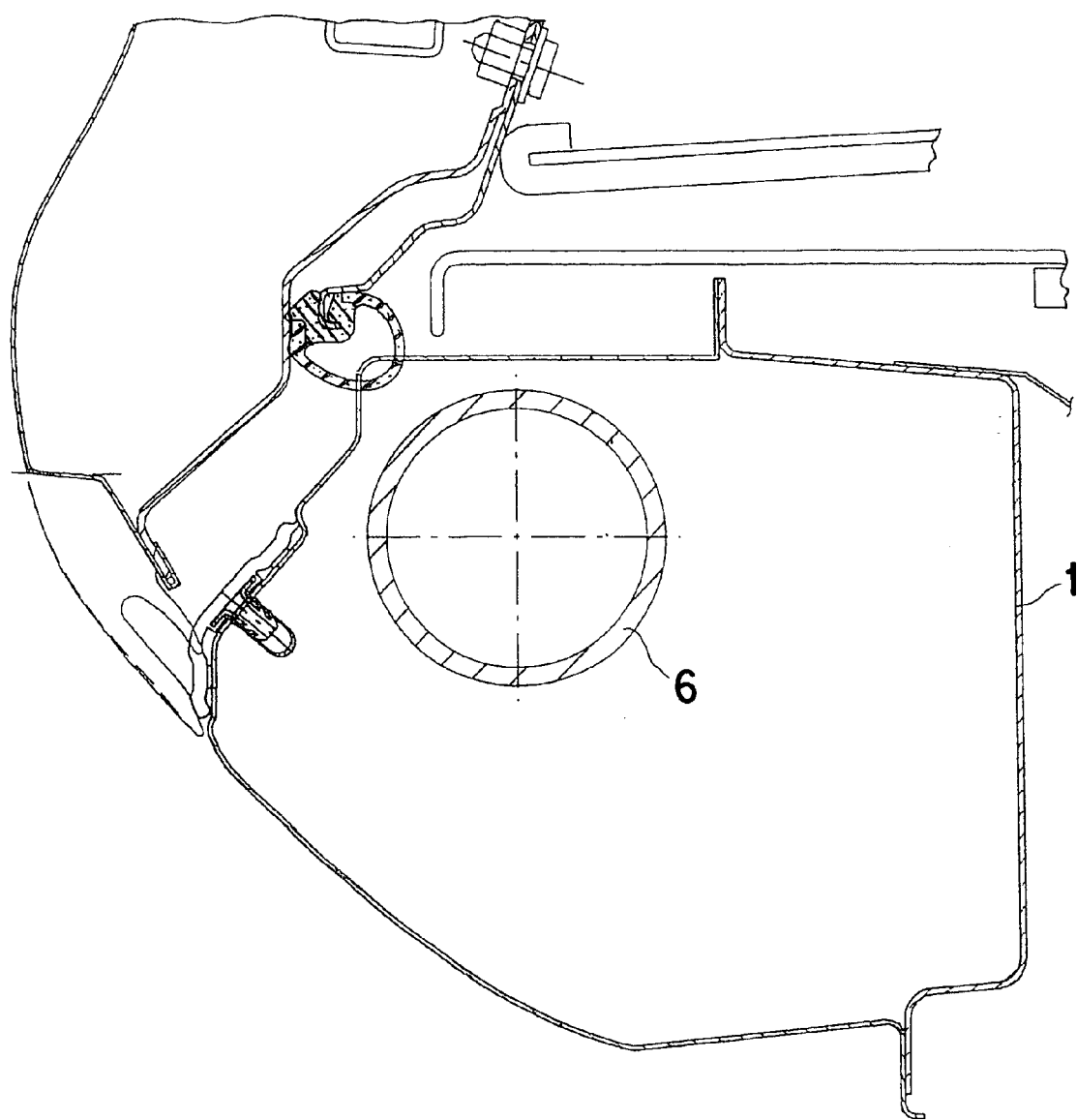
FIG. 6 is a cross section through the side wall assembly with integrated supporting members between the holders.

Between holding elements 7, 8, and 9 supporting member 6 is located lying freely, as especially shown in greater detail in FIG. 6.

Indentations 10 at the lower ends of columns A, B, and C are roughly adapted to the shape of the tube. Accordingly, supporting blocks 11 are made with an endwise area so that they have a half-round shaped end so that in the event of a lateral impact, supporting member 6 penetrates supporting block 11 with guidance or can deform the latter absorbing energy.

Figure 2:
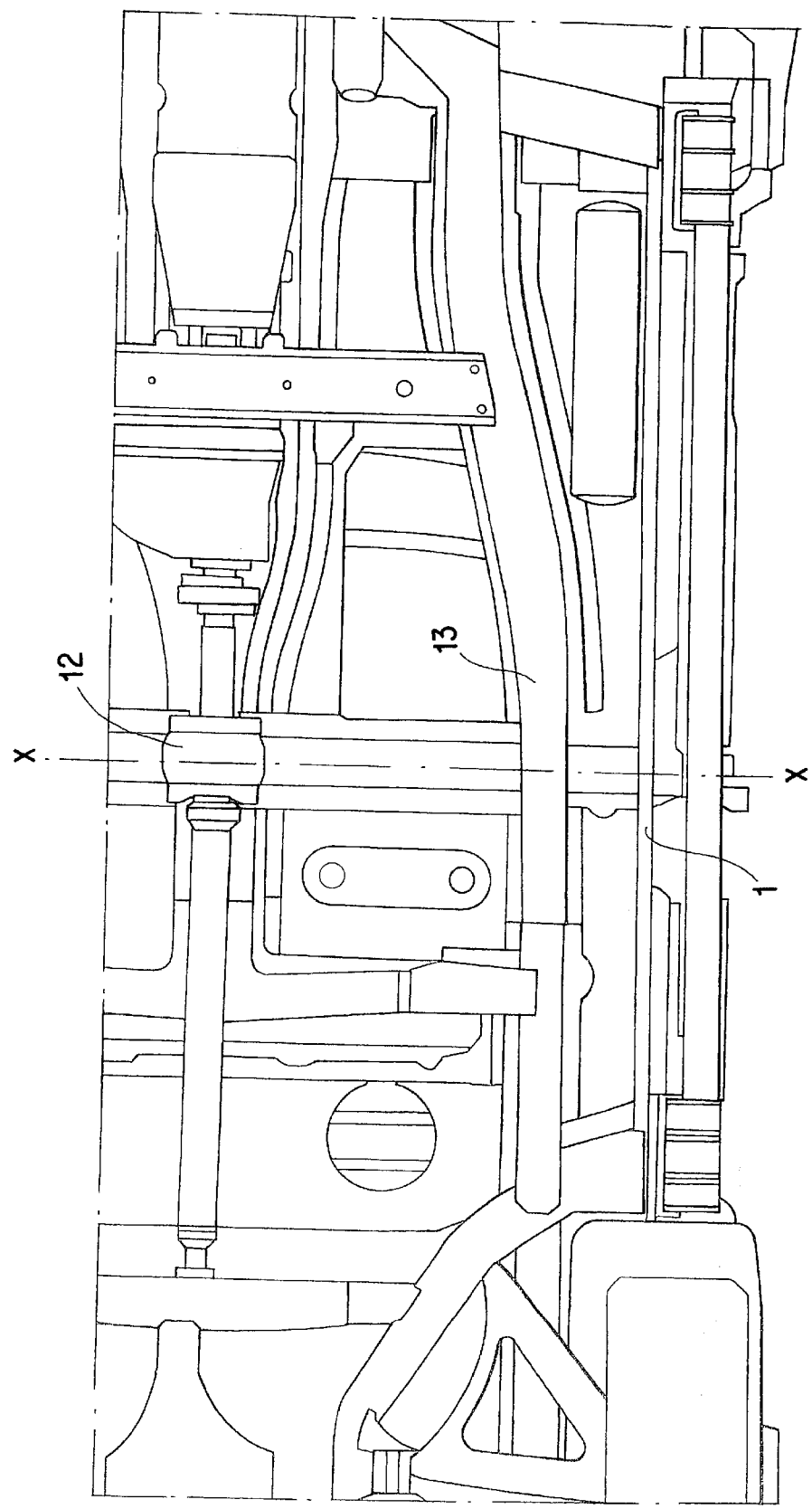
FIG. 2 is a view of the supporting member with lengthwise support and seat cross member in a view from below.
Figure 3:
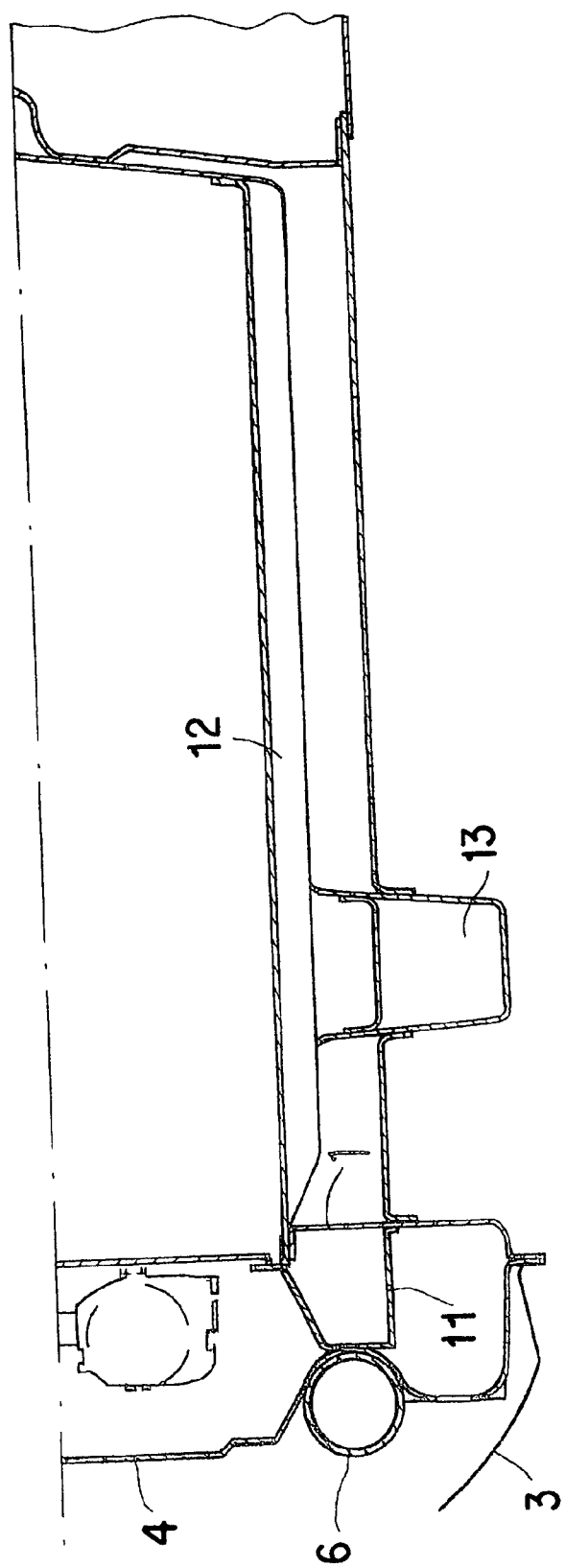
FIG. 3 is a cross section through a seat cross member with its support.
Figure 4:
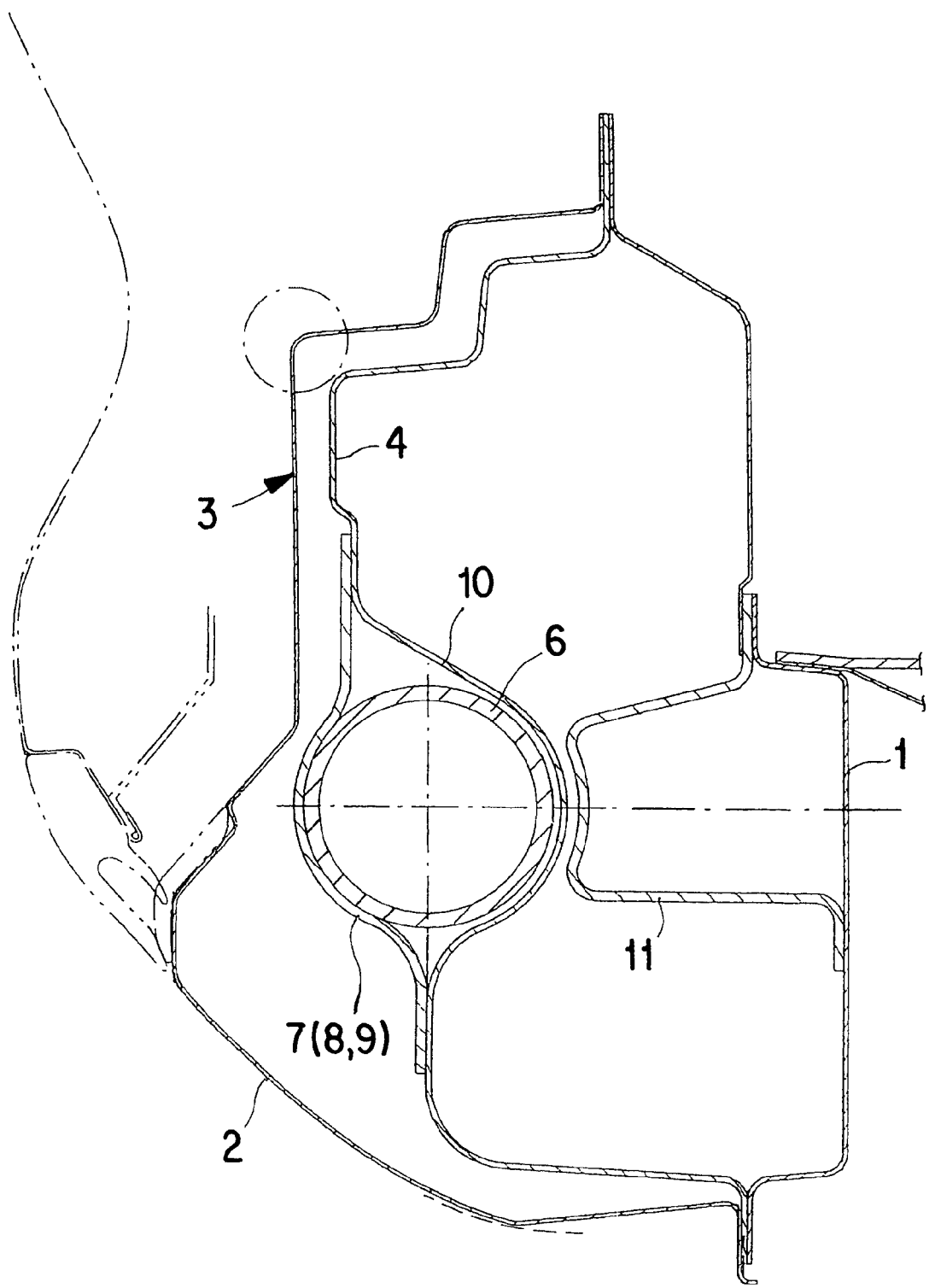
FIG. 4 is a cross section through the side wall assembly group with integrated supporting members and door indicated.
Figure 5:
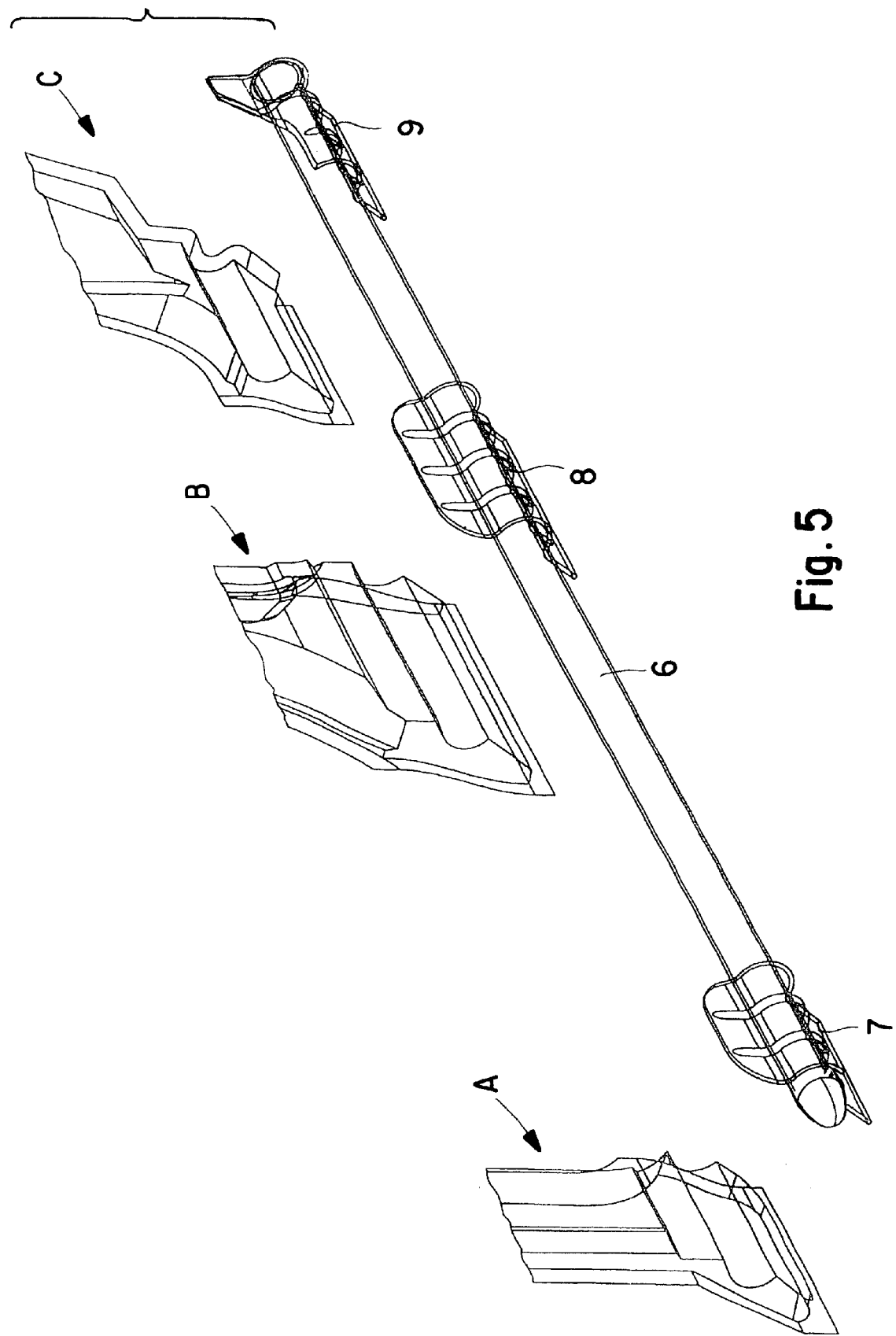
FIG. 5 is an enlarged view of the supporting member with holders and body pillars.

The B-pillar is located with its bottom end in a vertical plane x-x with a seat cross member 12 as shown in greater detail in FIG. 2. The seat cross member 12 is connected endwise with the inner reinforcing part 1 and with lengthwise support 13. Likewise, supporting block 11 and holding element 8 for supporting member 6 are located in this vertical plane x-x endwise of seat cross member 12. By this arrangement, an especially stable arrangement of the vehicle body in this area is achieved in the event of a lateral impact, so that the persons sitting in front are protected, especially in the head area.

Supporting member 6 also serves in the event of a rear or a front collision, to reduce the compression of the vehicle lengthwise in which, by means of a supporting member 6 that abuts the wheel, support is offered and deformation of the area lying between the wheels is counteracted. Supporting member 6 can also be provided with a deformation element at its free ends.

With a lateral impact in the vicinity of seat cross member 12, the outer wall 3 is pressed against supporting member 6 so that it travels into indentation 10 and against supporting block 11 which is supported on seat cross member 12. On the opposite side supporting block 11 is pressed against supporting member 6 and held thereon.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle with a lateral reinforcement located in an area of a lengthwise supporting member of a vehicle body, wherein the reinforcement includes the supporting member extending lengthwise which extends over an area between wheel boxes of the vehicle and is fastened by holding elements to body pillars of a lateral inside wall of the vehicle, and wherein between an inner reinforcing part and lower ends of the body pillars of the lateral inside wall, a supporting block is located opposite the supporting member.

2. A vehicle according to claim 1, wherein the body pillars of the lateral inside wall are connected endwise with a sill inner part as well as a sill outer part of a lateral outer wall, and wherein the supporting member is located in a sill area between the sill outer part and the lateral outer wall.

3. A vehicle according to claim 1, wherein one said supporting member is provided on each side of the vehicle, is located in an indentation of the body pillars and is secured by the holding elements adjacent a lateral outer wall.

4. A vehicle according to claim 2, wherein one said supporting member is provided on each side of the vehicle, is located in an indentation of the body pillars and is secured by the holding elements adjacent the lateral outer wall.

5. A vehicle according to claim 1, wherein the supporting member consists of a tubular element, wherein the holding elements consist of loop-type holders, and wherein the supporting member is fastened to the body pillars partially surrounded by the holders.

6. A vehicle according to claim 2, wherein the supporting member consists of a tubular element, wherein the holding elements consist of loop-type holders, and wherein the supporting member is fastened to the body pillars partially surrounded by the holders.

7. A vehicle according to claim 3, wherein the supporting member consists of a tubular element, wherein the holding elements consist of loop-type holders, and wherein the supporting member is fastened to the body pillars partially surrounded by the holders.

8. A vehicle according to claim 1, wherein the supporting block comprises a closed profile and has a concave, rounded depression matching and spaced from indentations in the body pillars.

9. A vehicle according to claim 1, wherein the supporting member is held by holders at indentations of the body pillars.

10. A vehicle according to claim 1, wherein one said supporting member is connected by at least three of the body pillars on each side of the vehicle by holders.

11. A vehicle according to claim 1, wherein three of the body pillars are provided, wherein a middle body pillar is located endwise at approximately a level of a seat cross member, and wherein a connection of the lengthwise supporting member is provided by a holder disposed in a vertical plane of the seat cross member projecting endwise from the seat cross member.

12. A vehicle according to claim 1, wherein the supporting member has an end cap as an endwise deformation element.

13. A vehicle according to claim 1, wherein the supporting member consists of metal or plastic.

14. A method of making a passenger vehicle body assembly comprising:

providing a lateral inside wall extending longitudinally of a vehicle between front and rear vehicle wheel cutouts, said inside wall including pillars, providing a supporting member, and connecting the supporting member at the pillars to be extending along a lower edge of the inside wall between the wheel cutouts with freely extending sections between the pillars, wherein between an inner reinforcing part and lower ends of the pillars of the lateral inside wall, a supporting block is located opposite the supporting member.

* * * * *